United States Patent [19]

Keating

[11] 4,041,852
[45] Aug. 16, 1977

[54] DEEP FAT FRYER FAT SAVER

[76] Inventor: Richard T. Keating, 715 S. 25th Ave., Oak Park, Ill. 60104

[21] Appl. No.: 702,355

[22] Filed: July 2, 1976

Related U.S. Application Data

[63] Continuation of Ser. No. 626,711, Oct. 29, 1975, abandoned.

[51] Int. Cl.² ............................................. A47J 37/12
[52] U.S. Cl. ...................................................... 99/403
[58] Field of Search .................................. 99/403–418; 426/438

[56] References Cited

U.S. PATENT DOCUMENTS

| 3,217,633 | 11/1965 | Anetsberger | 99/408 |
| 3,512,473 | 8/1970 | Moore | 99/411 |
| 3,646,882 | 3/1972 | Keating | 99/408 |

Primary Examiner—Harvey C. Hornsby
Assistant Examiner—Robert Pous
Attorney, Agent, or Firm—Rummler & Snow

[57] ABSTRACT

A deep fat fryer which saves on fat by reducing the amount of non-working fat in the fat-containing vessel by using fat displacers which are removable to permit the use of conventional tools for cleaning; wherein the periodic addition of make-up fat to said fat-containing vessel dispenses with the need for changing the fat therein over an unlimited period of time.

5 Claims, 7 Drawing Figures

U.S. Patent   Aug. 16, 1977   Sheet 1 of 3   4,041,852
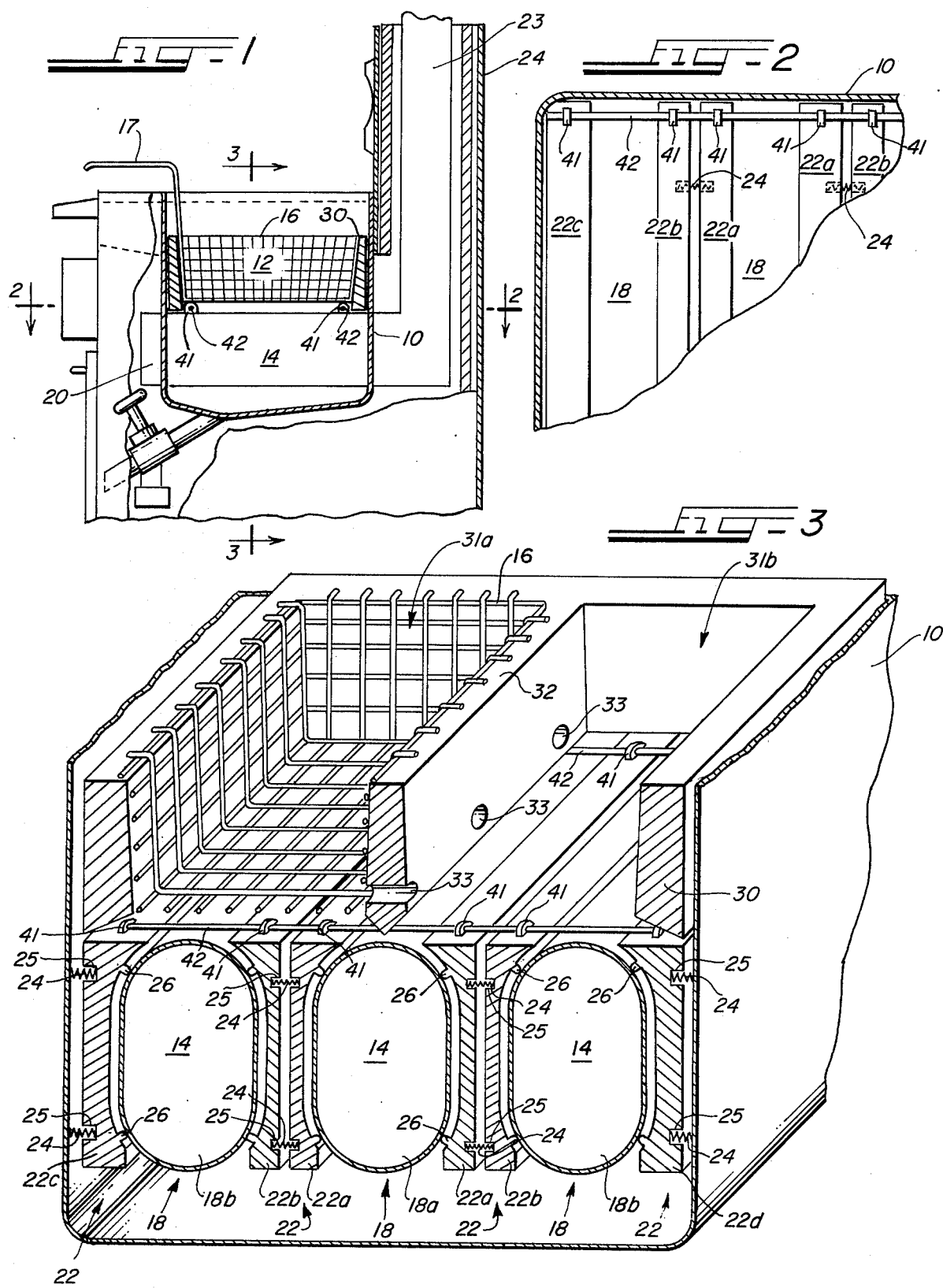

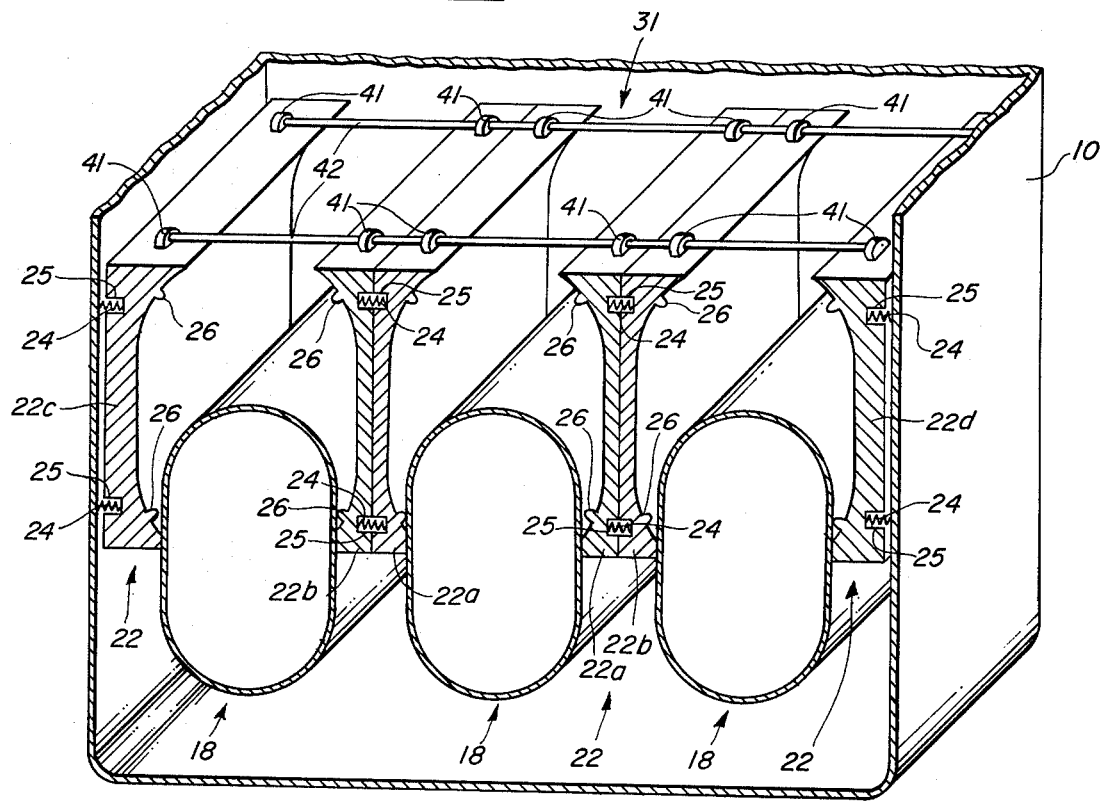
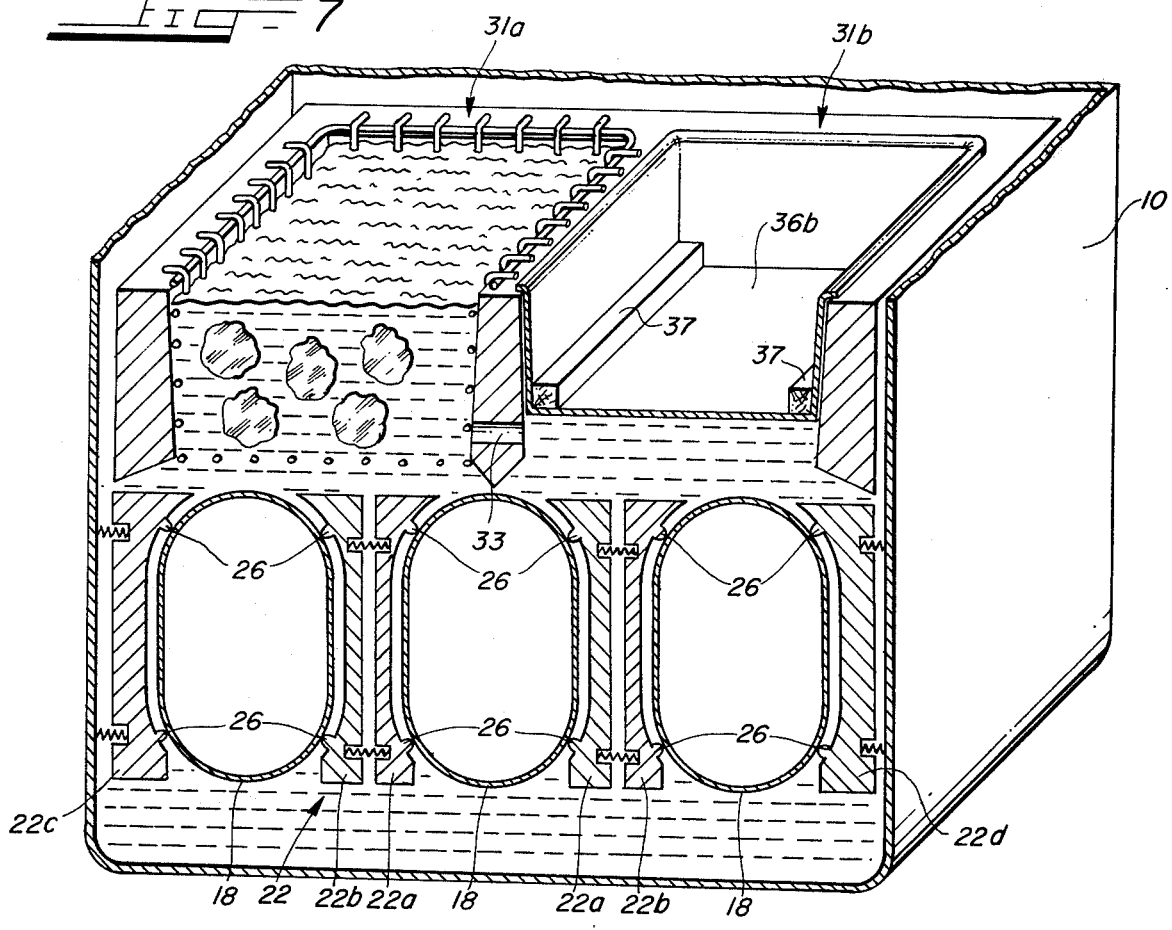

U.S. Patent  Aug. 16, 1977  Sheet 3 of 3  4,041,852
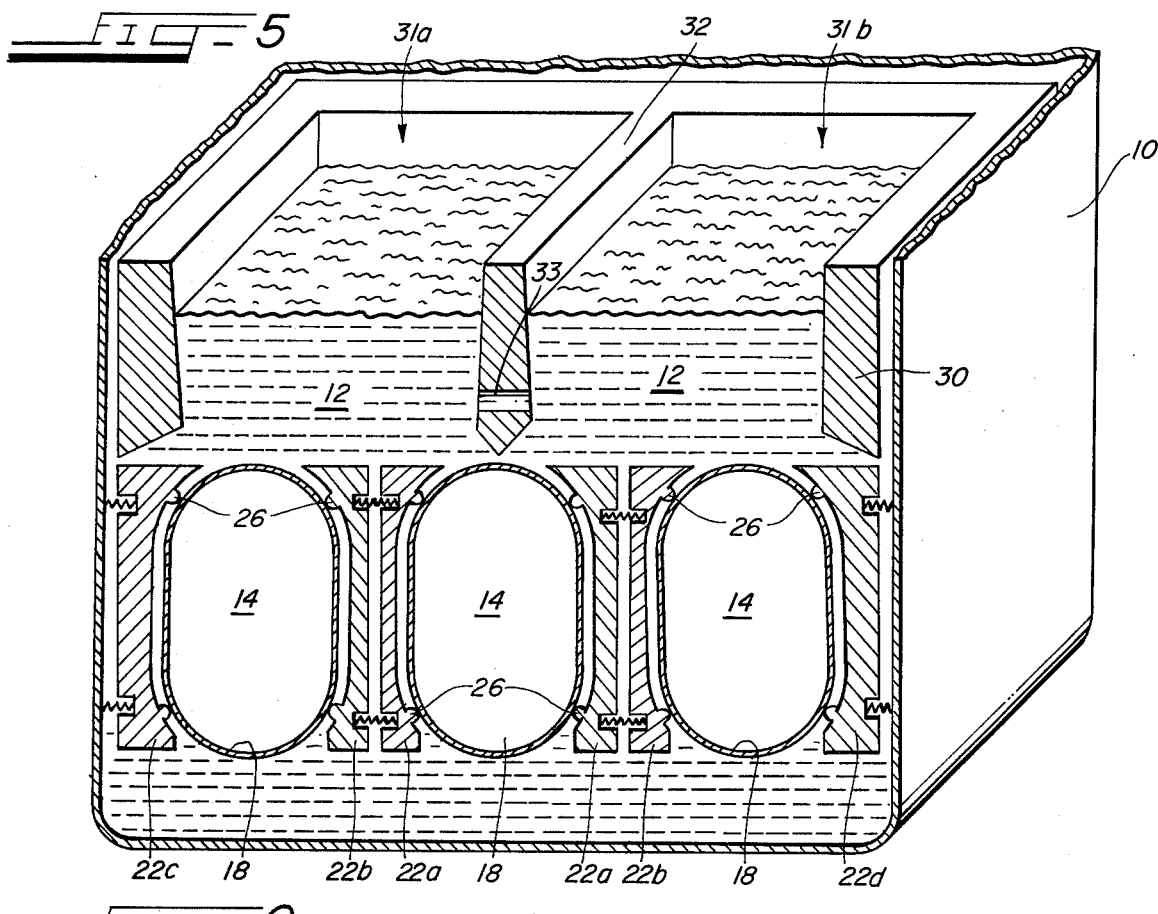
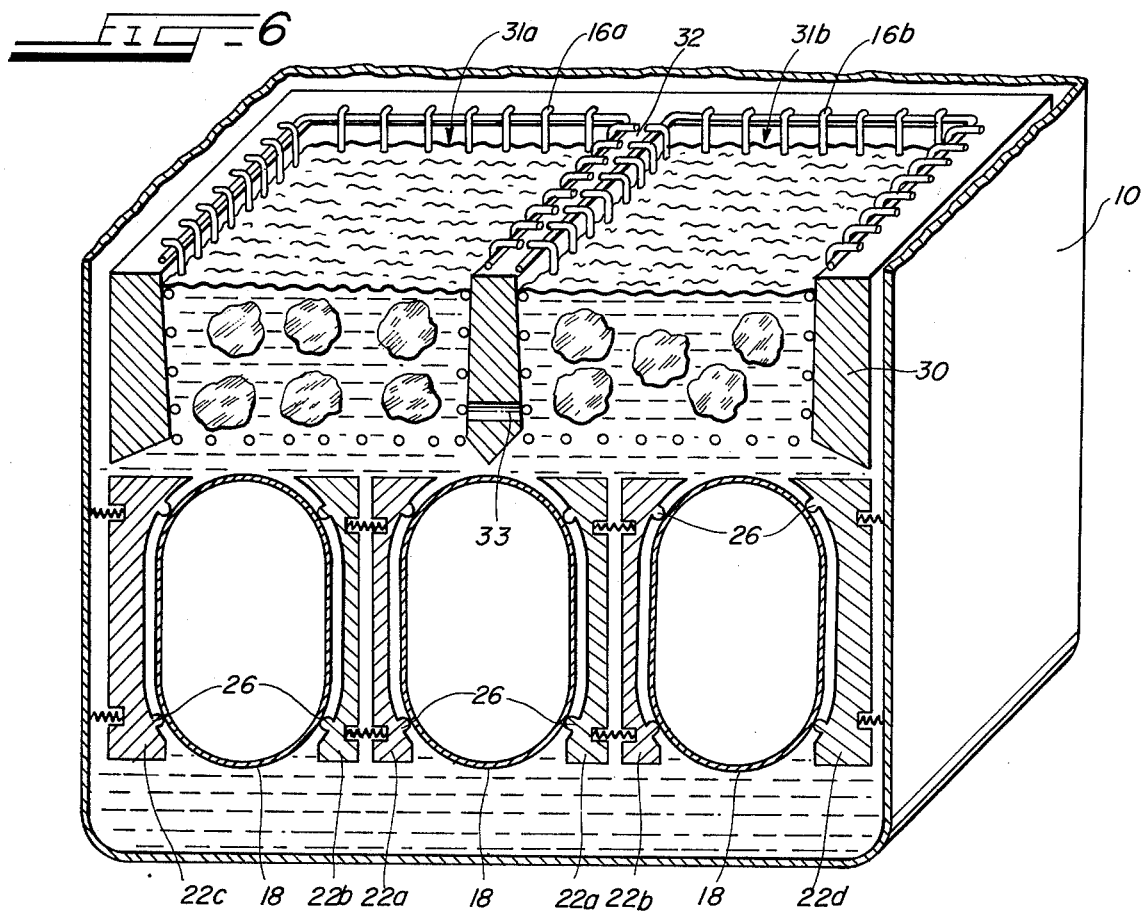

DEEP FAT FRYER FAT SAVER

This application is a continuation of my copending application, Ser. No. 626,711 filed Oct. 29, 1975, now abandoned.

BACKGROUND OF THE INVENTION

In the food service business, there is a rush at meals imposing at least two "peak demand" periods on cooking facilities leaving business during the rest of the day on a "stand-by" basis.

Originally there evolved a concept called the "flywheel effect" pertaining to the sufficiency of heat stored in "working" fat during stand-by which was required to meet the peak demands for cooking. The reason for this storage of heat was to permit the cooking of food which had a greater immediate heat requirment than that which the equipment was currently able to supply and to prevent the development of excessive temperature gradients within the fat under the sudden infusion of large amounts of heat which would quickly deteriorate the fat and produce greasy fried foods. Under this concept, fryers were designed with large reserves of fat so that much "non-working" fat was tied up in the fat-frying process.

In 1952, the state of the art changed when a new fryer design evolved which dispensed with the flywheel effect and minimized the amount of non-working fat held in reserve in the fat-containing vessel. It was found that the fat heat-up rate could be increased from 8.86°/minute F, as provided for in the American Standards requirements, to as much as 56°/minute F without damage to the fat therein if there was proper minimization of non-working fat. Faster heat-up, of course, made the fryer more capable of meeting the short order demands of the trade. A smaller amount of non-working fat tied up in reserve also made the fryer more economical in the use of fat.

The reduced need for reserve fat in the fryer also extended the life of the working fat. By working all fat to a more uniform temperature and exposing less fat to the atmosphere, such fryers actually resulted in less contamination during the fat-frying duty cycle.

As fat at cooking temperature deteriorates, the level of free fatty acid therein increases, and at some point the fat takes on an unpleasant flavor. A 4½ to 5% free fatty acid composition is generally considered as the top limit of acceptability. With a high turnover of make-up fat wherein, say, a quantity of fat equal to the total working and non-working fat in the fat-containing vessel is added as make-up fat over a period of 24 hours, the residual fat in the fat-frying duty cycle can establish an equilibrium composition well below this acceptable level of free fatty acid content and as long as the fat taken out of the vessel by absorption in the food is replenished, the residual fat need not be changed for an unlimited time. Such an equilibrium condition has been possible in the fat-containing vessels of the past having large fat reserves and operating under the so-called flywheel concept with frying of potato chips, which are sliced from 3 to 4 inches diameter potatoes and no thinner than 16 to 22 slices/inch, or very small cut French fries which are less than ⅛ to 3/16 inch square and up to 3 to 4 inches long each having high surface-to-volume ratio and because the high fat-absorptive characteristic of food products in these small sections makes a high turnover of make-up fat necessary.

Othe causes for the shortening of fat life in deep fat fryers come from food particle contamination of the fat. Commercial fryers must use conventional tools for cleaning fat fryers and removing crumbs and food particles which have settled from the frying portion to the bottom of the heating portion of the fat-containing vessel. These contaminants must be periodically removed or the quality of the food product will suffer. Interior metal surfaces of the fat-containing vessel and the heat exchanger tubes also become coated with a varnish-like deposit which is a contaminant affecting food quality and also must be periodically removed.

Another cause of shortened fat life comes from water vapor entrained in the food. Surface tension of the fat reduces as it is used for frying. Bubbles of water vapor from the goods being fried then rise through the fat and do not readily burst but remain as bubbles and expand and the fat foams. Foods cooked in foaming fat are excessively greasy, and lack quality.

There is, thus, an established need for a process and apparatus for deep fat frying food products having surface-to-volume ratios which are less than that normally characteristic of potatoe chips and small cut French fries, which process and apparatus would save on fat by displacing non-working fat from the heating and frying portions of the fat fryer and dispensing with the need for ever having to change the fat while maintaining free fatty acid content within acceptable limits by adding make-up fat from time-to-time.

SUMMARY OF THE INVENTION

The gist of this invention lies in an improved process and apparatus for deep fat frying food products having surface-to-volume ratios normally less than that of potato chips and small cut French fries. The process dispenses with the need to change fat in the fat-containing vessel over an unlimited time. The apparatus for performing this process comprises an open-top fat-containing vessel which provides for access to all interior surfaces thereof including heat exchanger tubes therein through the open top by conventional cleaning tools. The process involves immersing fat-displacement means in the fat between the heat exchanger tubes and between the tubes and the walls of the fat-containing vessel as well as between the baskets and between said baskets and the walls thereof for reducing the amount of non-working fat in the vessel, and adding make-up fat to the vessel as fat is absorbed and removed therefrom by the food product being fried. In the apparatus all fat-displacement means are removable through the open top of the fat-containing vessel.

When less than the maximum possible number of baskets are used in the process, the deficiency in displaced volume of fat incurred is made up by an additional step of immersing a dummy fat-displacing cover in the fat-containing vessel in place of the missing basket and the food product normally contained therein.

DESCRIPTION OF THE DRAWINGS

FIG. 1 shows a fragmented cross-sectional side view of a fat-saving deep fat fryer;

FIG. 2 shows a rotated and fragmented cross-sectional view of the same taken along line 2—2 of FIG. 1;

FIG. 3 shows a fragmented cross-sectional perspective view of the same, without fat and with one food product basket, as taken along line 3—3 of FIG. 1;

FIG. 4 is a view like FIG. 3 but with the frying portion fat-displacement means removed and the heating portion displacement means partially removed from the fat-containing vessel;

FIG. 5 shows a view like FIG. 3 with fat and without food product baskets;

FIG. 6 shows the same view as FIG. 3 with fat and with both food product and baskets; and FIG. 7 (see sheet 2) shows the same view as FIG. 3 with fat and as used with but one food product containing basket.

DESCRIPTION OF THE PREFERRED EMBODIMENT

Reference to FIGS. 1 and 2 shows a stainless steel fat-containing vessel 10 having a frying portion 12 and a heating portion 14, right and left-hand side walls, front and back walls, a bottom wall and an open top. The frying portion 12, in operation, contains hot liquid fat for frying food in baskets 16 and the heating portion 14 contains a plurality of heat exchanger elements for transmitting heat to the liquid fat content of the vessel and for transporting heat by convectional means from the lower heating portion 14 to the upper frying portion 12 thereof. In the form shown, gas fired heat exchanger tubes 18 from the front wall of fat-containing vessel 10 to the back wall thereof in spaced side-by-side relation and separated from the side walls thereof by distances which are sufficient to allow access to all surfaces and volumes therein through the open top of said vessel 10 for the purpose of easy cleaning by means of conventional tools. The heat exchanger tubes 18 have their top surfaces located below and within a working clearance of the bottom of the food baskets 16. Said heat exchanger tubes 18 also have their bottom surfaces located above the bottom of said fat-containing vessel 10 by a clearance which is sufficient to form a shallow "cold zone" for trapping and holding crumbs and food particles which settle to the bottom during frying and to permit easy removal of said crumbs and food particles with conventional tools. The heat exchanger tubes 18 join the front and rear walls of the vessel 10 with leak-proof junctures and openings at the front ends 20 of said tubes receive gas burners (not shown) and openings at the back end thereof communicate with a stack 23. A heat shield 24 surrounds the stack 23 on four sides.

As shown in FIG. 3, each heat exchanger tube 18 has a cross-section of a generally oval shape. Each tube 18 is symmetrical about its vertical and horizontal axes with the oblong axis lying in the vertical direction relative to the fat-containing vessel 10. No re-entrant surfaces or corners exist in the outer walls of the tubes 18 which cannot be cleaned with conventional tools from the open top of the vessel 10. In the form shown, the fryer is provided with a central heat exchanger tube 18a and a pair of similar heat exchanger tubes 18b located one on each side thereof.

First fat displacement means 22, made of extruded aluminum, inserts in the lower heating portion 14 of the fat-containing vessel 10, between the heat exchanger tubes 18a and 18b and between the heat exchanger tubes 18b and the adjacent side walls of the vessel 10. The first displacement means 22 comprises sections which extend parallel with the tubes 18 from one end of the vessel to the other, with working clearance of the end walls, and each section is of a width substantially equal to the height of the tubes from top to bottom. Each section of the displacement means 22 has a concaved face on one side and a flat face on the other side, the concave face of each section substantially conforming to the shape of the side wall of the heat exchanger tubes 18.

The inner, or between the tubes, sections of the first displacement means comprise identical members 22a and 22b which are arranged back-to-back with the concaved surfaces outward to face the respective tubes 18. In the apparatus shown, there will be two pairs of the sections 22a and 22b, the 22a sections facing the central tube 18 and the 22b sections facing the tubes 18b. The outer sections 22c and 22d are identical in form and each is disposed with its concaved surface facing a respective one of the tubes 18b and its flat surface facing the adjacent side wall of the vessel 10. A plurality of paired blind bores 25 are formed in each central section 22a and 22b and extend in mutually- concentric relation one to the other into each of the flat back faces thereof. Upper and lower ones of the bores 25 are provided adjacent each end of each 22a and 22b section. Four blind holes 25 likewise are formed in the flat outer sides of each section 22c and 22d there being a pair of such holes near each end of the said sections. A compression spring 24 is installed in each pair of the mutually-concentric blind bores 25 in said sections 22a and 22b, and in each blind bore 25 in sections 22c and 22d. Said compression springs 24 traverse the extended space between central sections 22a and 22b and between each of sections 22c and 22d and the inner surface of the respective flat side wall of the vessel 10.

Upper and lower nubbins 26 are provided at each end on the concave faces of each of the fat-displacement sections 22a, 22b, 22c and 22d of first fat-displacement means 22 for holding the concave face of each section in spaced relation with the convex outer wall of a respective heat exchanger tube 18. As shown, the thickness of the sections 22a and 22b is such that when engaged with the walls of adjacent tubes 18a and 18b there will be a space between them such that when the sections are in back-to-back contact with each other their combined thickness, including the nubbins, will be such as to permit them to be withdrawn upwardly from between the tubes 18. Similarly, the thickness of the sections 22c and 22d is such than when engaged with the respective tubes 18b there will be a space between each and the respective vessel wall greater than the overall thickness of each section, so as to permit withdrawal, as illustrated by FIG. 4.

The compression springs 24 which traverse the space between fat-displacement sections 22a and 22b, and between the respective vessel walls and sections 22c and 22d, constantly urge the sections toward the respective tubes 18 and at the same time allow movement of the sections clear of the tubes for withdrawal, as shown in FIG. 4.

Two bored lugs 41 attach to the top of each of the fat-displacement sections 22a, 22b, 22c and 22d, one of which lugs 41 being adjacent to the front wall of the fat-containing vessel 10 and the other being adjacent to the back wall of the vessel. Bores 43 in lugs 41 at each end of the displacement sections bear a mutually-concentric relation one to the other upon installation of the first fat-displacement means 22 between the heat exchanger tubes 18a and 18b and between the heat exchanger tubes 18b and the side walls of the fat-containing vessel 10, as shown in FIGS. 1, 2 and 3. Straight stainless steel rods 42 slidably extend through the bores 43 in lugs 41 at each end of the displacement sections and provide means for handling the displacement means 22 as a unit for installation in or removal from the fat-containing vessel 10.

A second fat-displacement means 30 also made of extruded aluminum material is removably disposed in the frying portion 12 and has right and left-hand food frying wells 31a and 31b with a dividing partition 32 therebetween. Each well 31a and 31b has an open top and an open bottom and four side walls thereabout and is in fluid communication with the heating portion 14, as shown in FIG. 3. As shown, the outer side walls of said second fat-displacement means 30 bear a spaced relation with the inner surfaces of the side and front and back walls of said fat-containing vessel 10. Inner side walls of said frying wells 31a and 31b of said second fat-displacement means 30 taper inwardly in the downwardly direction from the top thereof and the bottom surfaces of said second fat-displacement means 30 bear on the top surface of said first fat-displacement means 22.

Frying wells 31a and 31b in the second fat-displacement means 30 are in fluid communication with the heating portion 14 of the fat-containing vessel 10 inclusive of the concave spaced relation between the central sections 22a and 22b and the convex outer side walls of the heat exchanger tubes 18 of the heating portion 14 of said vessel 10. A plurality of crossbores 33 extend through the dividing partition 32 between cooking wells 31a and 31b of said second fat-displacement means 30 at a location adjacent to the bottom thereof providing cross flow communication between wells 31a and 31b.

A food-containing stainless steel wire mesh basket 16 has a rectangular shape and comprises four side walls, a bottom and an open top, and as shown in FIG. 1, a handle 17 extends from the top of the wall on the short side of the basket. Each side wall of the basket tapers inwardly in a downward direction and closely fits within the four side walls of frying well 31 and a rim around the top of the basket 16 rests on the top of the frying well wall, as shown in FIG. 3. As shown, the bottom of the basket 16 is spaced a minimum working clearance above the top of heat exchanger tubes 18.

FIG. 7 illustrates the condition when only one basket 16 is used for cooking and in that case, a dummy basket-shaped stainless steel cover 36b, which comprises four side walls, a bottom and an open top, is used to displace fat to the cooking well and to close off the fat in the unused well against contact by air. A handle 38 (not shown) extends from the top of the wall on the short side of the dummy cover 36b and each side wall tapers inwardly in a downwardly direction and closely fits within the four side walls of frying well 31b of the second fat displacement means 30. A rim around the top of the dummy cover 36b rests on the top of the frying well wall 31b, as shown in FIG. 7. The bottom of the dummy cover 36b is spaced above the top of heat exchanger tubes 18 a distance sufficient to displace enough fat from the right-hand frying well 31b through the cross-bores 33 into the left-hand frying well 31a and maintain the food in basket 16a in left-hand frying well 31a covered with fat and for that purpose, the cover 36b is designed to have a fat- displacing volume substantially equal to the volume of a normally-filled basket of food to be cooked. Stainless steel ballast bars 37 mount on the bottom of the dummy cover 36b to keep it from floating.

In the operation of the fat-saver deep-fat fryer, first and second fat-displacement means 22 and 30 are installed in the heating and frying portions 12 and 14, respectively, and fat is added to the fat-containing vessel 10 until the melted fat level in both right and left-hand heating wells 31a and 31b is below the top of the second fat-displacement means 30 by a predetermined distance, as shown in FIG. 5. Usually, right and left-hand baskets 16a and 16b containing food insert into right and left-hand frying wells 31a and 31b, respectively, displacing the liquid fat until the fat level rises in both frying wells 31a and 31b to cover the food in the baskets 16a and 16b for frying, as shown in FIG. 6. When only one basket 16 containing food is inserted into a frying well 31, the dummy cover 36b is placed into the unused frying well 31 whereby the fat therein is displaced through the cross-bores 33 and rises to cover the food in the basket, as shown in FIG. 7.

Although but one specific embodiment of this invention is herein shown and described, it will be understood that details of the construction shown may be altered or omitted without departing from the spirit of the invention as defined by the following claims.

I claim:

1. In an open-top vessel containing fat for deep fat frying having a heating portion wherein heat exchanger tubes with convex outer walls on each side thereof are mounted in spaced relation with respect to each other and with respect to the walls of the said vessel and a frying portion wherein food-containing baskets inserted therein are suspended above said heating portion, the fat in said vessel at least filling said heating portion, the improvement comprising:
   a. Removable first fat-displacement means inserted in the heating portion of the said vessel through the open top thereof inbetween the heat exchanger tubes therein and between said tubes and the walls of said vessel parallel therewith, means supporting said first fat-displacement means in spaced relation with the walls of said heat exchanger tubes; and
   b. Removable second fat-displacement means inserted in the frying portion of the said vessel through the open top thereof inbetween the baskets therein and between said baskets and the walls of said vessel to raise the level of the fat therein sufficiently to cover the food in said baskets;

whereby the non-working fat in the said vessel is minimized and all surfaces therein are accessible to conventional cleaning tools through the open top thereof.

2. In the deep fat fryer as set forth in claim 1 wherein the removable first fat-displacement means comprises:
   a. a first body having a concave face on each side thereof each of which bears a spaced and conforming relation with the convex side walls of the adjacent heat exchanger tube in the heating portion of the said vessel and a flat vertical split between the concave faces thereof for dividing the body into two sections, said flat faces on each side of said split bearing a spaced and parallel relation with respect to each other for permitting the removal of said body from the said vessel by contraction of the sections toward each other, and resilient means between the flat faces of said body for normally urging them apart;
   b. a second body disposed between each side wall of said vessel and the adjacent heat exchanger tube and having a concave face on one side which bears a spaced and conforming relation with the said heat exchanger tube and a flat face on the opposite side having resilient means bearing against the respective side wall for normally holding the body in a spaced and parallel relation with the said side wall and yet permitting the removal of said body from the vessel by first shifting the body toward the said wall against said resilient means to release the body from engagement with the respective heat exchanger tube; and c. a plurality of spaced nubbins projecting from the concave face of each first and second body for bearing upon the convex side wall of the adjacent heat exchanger tube and spacing the body therefrom.

3. In the deep fat fryer as set forth in claim 1 wherein the removable second fat-displacement means comprises:

a. a body having side walls enclosing a plurality of frying wells each well being separated by a dividing partition from adjacent wells and having an open top and an open bottom and means for fluid communication between the wells;

b. outer sides of said side walls of said body having a parallel loose-fitting relation with the walls of the frying portion of said vessel when inserted therein for permitting the easy removal of said body from the fat-containing vessel.

4. In an open-top vessel containing fat for deep fat frying having a heating portion wherein heat exchanger elements are mounted in laterally-spaced relation with respect to each other and with respect to the walls of the said vessel and a frying portion wherein food-containing baskets inserted therein are suspended above said heating portion, the fat in said vessel at least filling said heating portion, the improvement comprising:

a. removable first fat-displacement means inserted in the heating portion of the said vessel through the open top thereof inbetween the heat exchanger elements therein and between said elements and the walls of said vessel in parallel relation therewith;

b. means for supporting said first fat-displacement means in spaced relation with the walls of said heat exchanger elements; and c. removable second fat-displacement means inserted in the frying portion of said vessel through the open top thereof and dividing the said frying portion into a plurality of wells each of a size to receive a food-containing basket suspended therein, said second fat- displacement means comprising members of a size sufficient to raise the level of the fat in said frying portion so as to cover the food contained in at least one of said baskets.

5. A deep fat fryer as defined by claim 4 wherein one of the members of the removable second fat-displacement means comprises a generally box-like element having imperforate walls and being of a volumetric size substantially the same as the food-containing basket made for suspension in said wells.

* * * * *